D. L. J. BROADBENT.
FITTING FOR ELECTRICAL CONDUIT SYSTEMS.
APPLICATION FILED JUNE 11, 1914.
1,224,269.
Patented May 1, 1917.
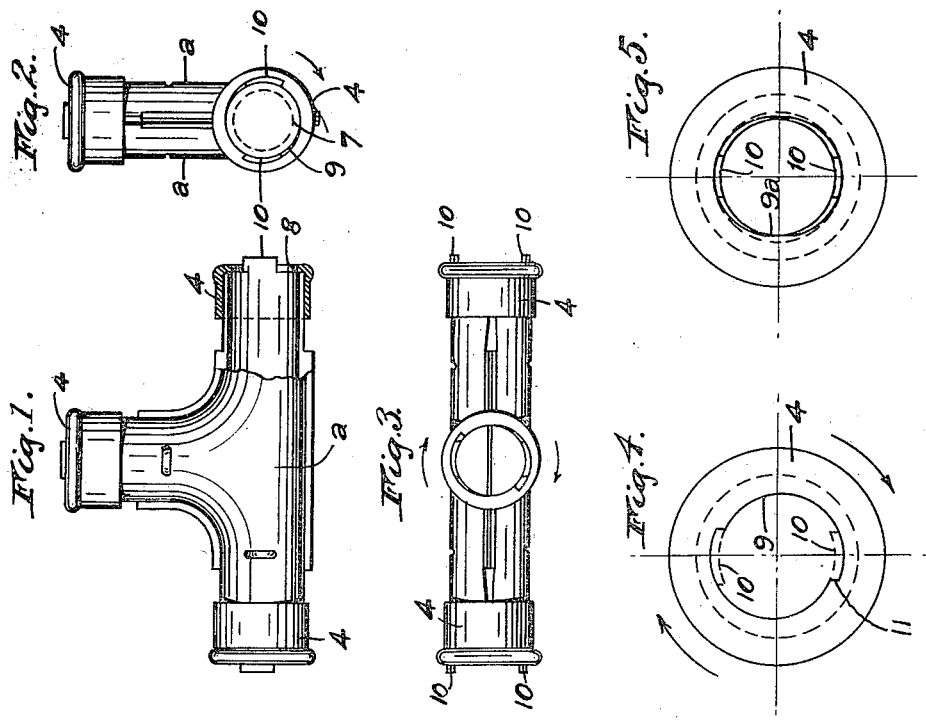

UNITED STATES PATENT OFFICE.

DAVID LESLIE JAMES BROADBENT, OF SOUTHPORT, ENGLAND.

FITTING FOR ELECTRICAL-CONDUIT SYSTEMS.

1,224,269.   Specification of Letters Patent.   Patented May 1, 1917.

Application filed June 11, 1914.   Serial No. 844,517.

*To all whom it may concern:*

Be it known that I, DAVID LESLIE JAMES BROADBENT, a subject of the King of Great Britain, and a resident of Southport, Lancashire, England, have invented certain new and useful Improvements in Fittings for Electrical-Conduit Systems, of which the following is a specification.

The present invention relates to improvements in that type of fitting for metallic conduit systems of electrical wiring in which the branches of the fittings, such as Ts, bends, couplings, inspection boxes, or the like, are adapted to be keyed or gripped to the conduits in order to secure an effective electrical continuity throughout the system of conduits and fittings.

In the modification of the invention the detachable rings are provided with recesses preferably formed in turned in edges on the rings, and the branches of the fittings with oppositely disposed projections, the recesses of the rings being adapted to engage the projections of the branches and accurately position the holes in the detachable rings with respect to the slots in the branches. Such recesses in the ring edges may be chamfered, so that, by rotating the ring the chamfered edges of the recesses wedge or compress the projections of the branches of the fittings into close contact with the conduit to produce an electrical continuity throughout the system. In a modification of this latter arrangement, the turned in edges of the detachable rings are formed with spiral or eccentric cam faces of gradual slope such that, after the ring has been axially inserted in position on the branches of the fitting and over the projections thereon, if the rings be rotated the curved cam faces compress or wedge the projections into intimate contact with the conduit. Such curved cam faces may finish abruptly in shoulders or abutments adapted to limit the rotational movement of the ring in one direction, or the curved cam faces may take the form of an oval or ellipse, so that the cam action of the oval edge may be brought to bear on the projections of the branch by turning the ring in either direction.

The invention is illustrated in the accompanying drawings, in which Figure 1, is an elevation, partly in section, of such a fitting, Fig. 2, an end view, and Fig. 3, a plan view, of modified form. Figs. 4 and 5, are end views, to a larger scale, of two forms of cam surfaces on the detachable rings.

In the drawings, the detachable rings 4 of the fittings *a* are provided with turned in edges 8 which are formed with spiral or eccentric cam faces 9 of gradual slope. The branches of the fittings are provided with projections 10, preferably oppositely disposed and one on each half of the fitting. The cam faces 9 on the detachable rings are so shaped and disposed that when the ring is in the position with reference to the projections shown in Fig. 8, it may be axially inserted on the branch of the fitting and over the projections thereon. If the ring be then given, say, a quarter turn in the direction of the arrows, Figs. 2, 3, 4, the curved cam faces 9 compress or wedge the projections 10 into intimate contact with the conduit. Such curved cam faces 9 may finish abruptly in shoulders 11, Fig. 4, adapted to limit the rotational movement of the rings in one direction, or as shown in Fig. 5, the curved cam faces 9$^a$ may take the form of an oval or ellipse formed on the turned in edge of the ring, so that the cam action of the oval edge may be brought to bear on the projections of the branch by turning the ring in either direction. In the end view Fig. 2, the ring 4 is shown in the initial position in which it has just been slid over the projections 10, and in Fig. 3, the central ring 4 is shown partially rotated to the position in which the projections 10 are pressed into contact with the conduit.

Though a particular method of forming the cam faces on the turned in edges of the rings has been described, the cam faces or the like may be formed in any suitable manner, the essential feature of the invention consisting in a detachable ring for fitting to the branch of a divided or other fitting, such detachable ring having a cam face so disposed that on rotating the ring the cam face comes into action and compresses a part of the divided fitting into intimate contact with the conduit.

With my device, should it be desired to inspect the wiring in a divided fitting or remove such fitting, the rings are merely slid off the branches on to the conduits and the top half of the fitting removed for inspection, or the complete fitting may be changed from a T or three-way fitting to a four-way fitting, and so on, without disturbing the surrounding conduit and wiring. The invention provides a perfect type of grip conduit system, as well as securing effective electrical continuity.

I claim:—

In a fitting for a metallic conduit system of electric wiring, in combination; a branch on the fitting for engaging the conduit, projections on the branch, a detachable ring fitting rotatively over the branch, a turned in edge on the ring, recesses in the turned in edge for engaging the projections, curved cam faces formed in the turned in edge, adapted on the rotation of the ring to compress the projections on to the conduit, and shoulders on the turned in edge adapted to engage the projections on the branch and limit the rotation of the ring in one direction.

In testimony whereof I affix my signature in presence of two witnesses.

DAVID LESLIE JAMES BROADBENT.

Witnesses:
A. J. DAVIES,
H. WILLIAMS.

Copies of this patent may be obtained for five cents each, by addressing the "Commissioner of Patents, Washington, D. C."